(12) United States Patent
Varghese et al.

(10) Patent No.: US 10,855,594 B2
(45) Date of Patent: Dec. 1, 2020

(54) FIBRE CHANNEL FORWARDER LOAD BALANCING SYSTEM

(71) Applicant: Dell Products L.P., Round Rock, TX (US)

(72) Inventors: Vibin Varghese, Tamil Nadu (IN); Ramesh Kumar Subbiah, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 77 days.

(21) Appl. No.: 16/034,758

(22) Filed: Jul. 13, 2018

(65) Prior Publication Data

US 2020/0021527 A1 Jan. 16, 2020

(51) Int. Cl.
*H04L 12/803* (2013.01)
*H04L 29/08* (2006.01)

(52) U.S. Cl.
CPC ........ *H04L 47/125* (2013.01); *H04L 67/1097* (2013.01)

(58) Field of Classification Search
CPC .......................... H04L 47/125; H04L 67/1097
See application file for complete search history.

(56) References Cited

U.S. PATENT DOCUMENTS

| | | | |
|---|---|---|---|
| 7,633,955 B1 * | 12/2009 | Saraiya ................. | H04L 49/356 370/395.31 |
| 7,782,869 B1 * | 8/2010 | Chitlur Srinivasa ....................... | H04L 49/358 370/395.41 |
| 7,831,681 B1 * | 11/2010 | Salli ...................... | G06F 15/167 709/212 |
| 7,912,051 B1 * | 3/2011 | Rowlands ............... | H04L 45/02 370/230 |
| 8,351,442 B1 * | 1/2013 | McGlaughlin ........ | G06F 13/128 370/401 |
| 9,450,877 B1 * | 9/2016 | Kamisetty ............. | H04L 49/351 |
| 10,003,521 B2 * | 6/2018 | Vemula ................. | H04L 49/357 |
| 2004/0139237 A1 * | 7/2004 | Rangan ................. | G06F 3/0613 710/1 |
| 2006/0087963 A1 * | 4/2006 | Jain ....................... | H04L 49/552 370/217 |
| 2007/0239944 A1 * | 10/2007 | Rupanagunta ........ | G06F 3/0613 711/147 |
| 2009/0092141 A1 * | 4/2009 | Banerjee ............... | H04L 49/354 370/397 |
| 2009/0157846 A1 * | 6/2009 | Shimozono ........... | H04L 49/253 709/218 |
| 2009/0254640 A1 * | 10/2009 | Otani .................... | G06F 3/0605 709/221 |

(Continued)

*Primary Examiner* — Blake J Rubin
(74) *Attorney, Agent, or Firm* — Haynes and Boone, LLP

(57) ABSTRACT

A Fibre Channel Forwarder (FCF) load balancing system includes a Fibre Channel Forwarder (FCF) device that is coupled to a Fibre Channel (FC) networking device and the first server device. The FCF device groups a first link between the FC networking device and the FCF device with a second link between the FC networking device and the FCF device in response to receiving both a first fabric login accept on the first link that includes a first Worldwide Name (WWN) and a second fabric login accept on the second link that includes the first WWN. The FCF device provides at least a portion of traffic, received from the first server device that is logged in through the first link, through the second link.

20 Claims, 13 Drawing Sheets

(56) References Cited

U.S. PATENT DOCUMENTS

| | | | |
|---|---|---|---|
| 2010/0085981 A1* | 4/2010 | Gupta | H04L 67/1097 370/419 |
| 2010/0226281 A1* | 9/2010 | Ghosh | H04L 67/1097 370/254 |
| 2010/0250785 A1* | 9/2010 | Shin | G06F 3/067 710/3 |
| 2010/0313256 A1* | 12/2010 | Sekiguchi | H04L 63/102 726/7 |
| 2011/0110381 A1* | 5/2011 | Atkinson | H04L 47/125 370/419 |
| 2011/0228670 A1* | 9/2011 | Sasso | H04L 41/0668 370/221 |
| 2011/0274114 A1* | 11/2011 | Dhar | H04L 12/56 370/401 |
| 2011/0299402 A1* | 12/2011 | Vobbilisetty | H04L 45/586 370/241 |
| 2012/0155469 A1* | 6/2012 | Majumdar | H04L 45/26 370/392 |
| 2012/0265994 A1* | 10/2012 | Jibbe | H04L 9/3234 713/179 |
| 2013/0028135 A1* | 1/2013 | Berman | H04L 12/4625 370/254 |
| 2013/0152083 A1* | 6/2013 | Miki | G06F 9/5077 718/1 |
| 2014/0032727 A1* | 1/2014 | Kano | H04L 67/1097 709/223 |
| 2014/0269745 A1* | 9/2014 | Johnson | H04L 45/745 370/401 |
| 2014/0365622 A1* | 12/2014 | Lyengar | H04L 12/4641 709/220 |
| 2015/0134766 A1* | 5/2015 | Jayanarayana | G06F 15/17331 709/213 |
| 2015/0370668 A1* | 12/2015 | Nazari | H04L 41/0668 714/6.3 |
| 2016/0019005 A1* | 1/2016 | Mori | G06F 11/1076 711/114 |
| 2016/0087841 A1* | 3/2016 | Bharadwaj | H04L 41/18 709/221 |
| 2018/0278575 A1* | 9/2018 | Varghese | H04L 61/20 |

* cited by examiner

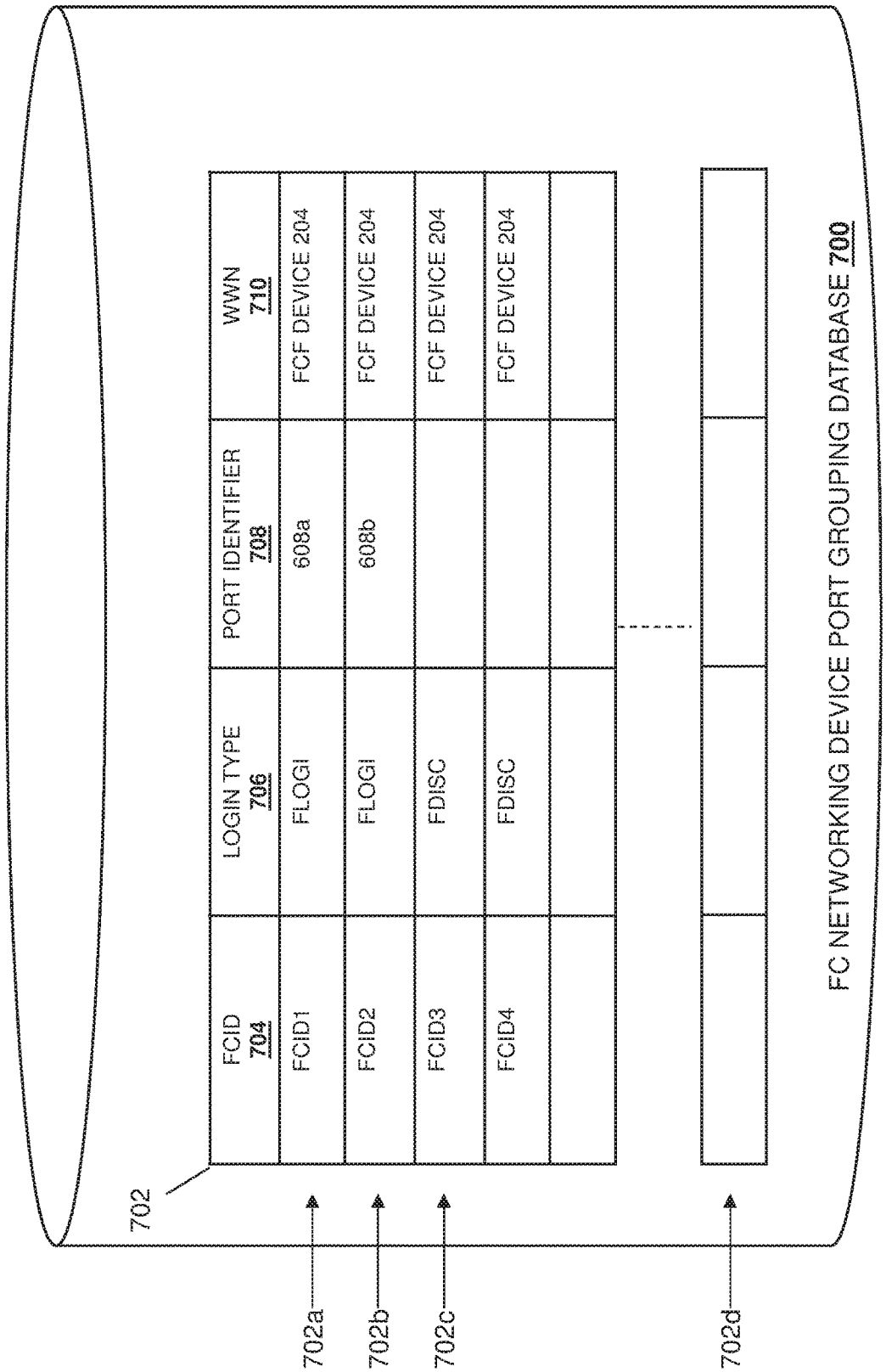

FIBRE CHANNEL FORWARDER LOAD BALANCING SYSTEM

BACKGROUND

The present disclosure relates generally to information handling systems, and more particularly to Fibre Channel Forwarder (FCF) load balancing for information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems provide a Fibre Channel (FC) Storage Area Network (SAN) for the storage of data. In such systems, an FC switch may be utilized to couple the FC SAN to servers via a Fibre Channel Forwarder (FCF) that performs FC over Ethernet (FCoE)-to-FC protocol conversions on Ethernet communications sent from the servers to the FC SAN, as well as FC-to-FCoE protocol conversions on FC communications sent from the FC SAN to the servers. Such FCFs allow for servers that communicate via the Ethernet protocol to utilize FC SANs that communicate via the FC protocol. However, the conventional functionality of such FCFs raises a number of issues.

For example, servers in such systems may utilize a Converged Network Adapter (CNA) to communicate with an N_Port ID Virtualization (NPIV) Proxy Gateway (NPG) in the FCF in order to provide login communication for logging into the FC SAN, with the FCF converting those login communications and the NPG providing them to the FC switch in order to log the server into the FC SAN. The NPG may establish links with the FC switch via, for example, a plurality of virtual uplinks from servers on each physical link provided between the NPG and the FC switch, and may operate to load balance logins received from servers via those links. However, in conventional FC SANs, traffic to and from servers is provided only on the physical link used by the server to log in with the FC SAN. This results in uneven traffic balancing, or underutilization of available bandwidth on other physical links between the NPG and the FC switch.

Accordingly, it would be desirable to provide an improved FCF load balancing system.

SUMMARY

According to one embodiment, an Information Handling System (IHS) includes a plurality of ports; a processing system that is coupled to the plurality of ports; and a memory system that is coupled to the processing system and that includes instructions that, when executed by the processing system, cause the processing system to provide an N_Port ID Virtualization (NPIV) Proxy Gateway (NPG) engine that is configured to: group a first link between an FC networking device and a first port of the plurality of ports with a second link between the FC networking device and a second port of the plurality of ports in response to receiving both a first fabric login accept on the first link that includes a first Worldwide Name (WWN) and a second fabric login accept on the second link that includes the first WWN; and provide at least a portion of first traffic, received from a first server device that is logged in through the first link, through the second link.

BRIEF DESCRIPTION OF THE DRAWINGS

FIG. 10B is a schematic view illustrating an embodiment of information being provided in the FC networking device port grouping database of FIG. 7 during the method of FIG. 8.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
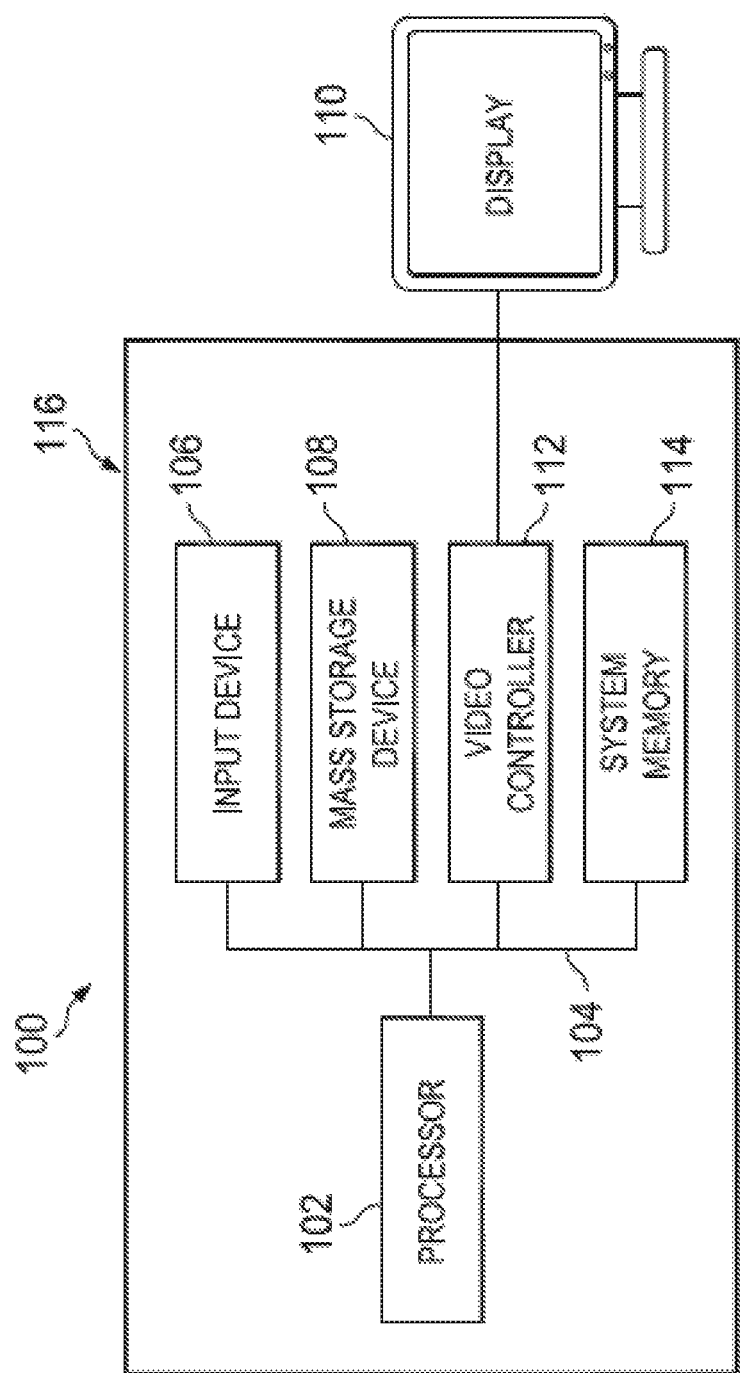
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
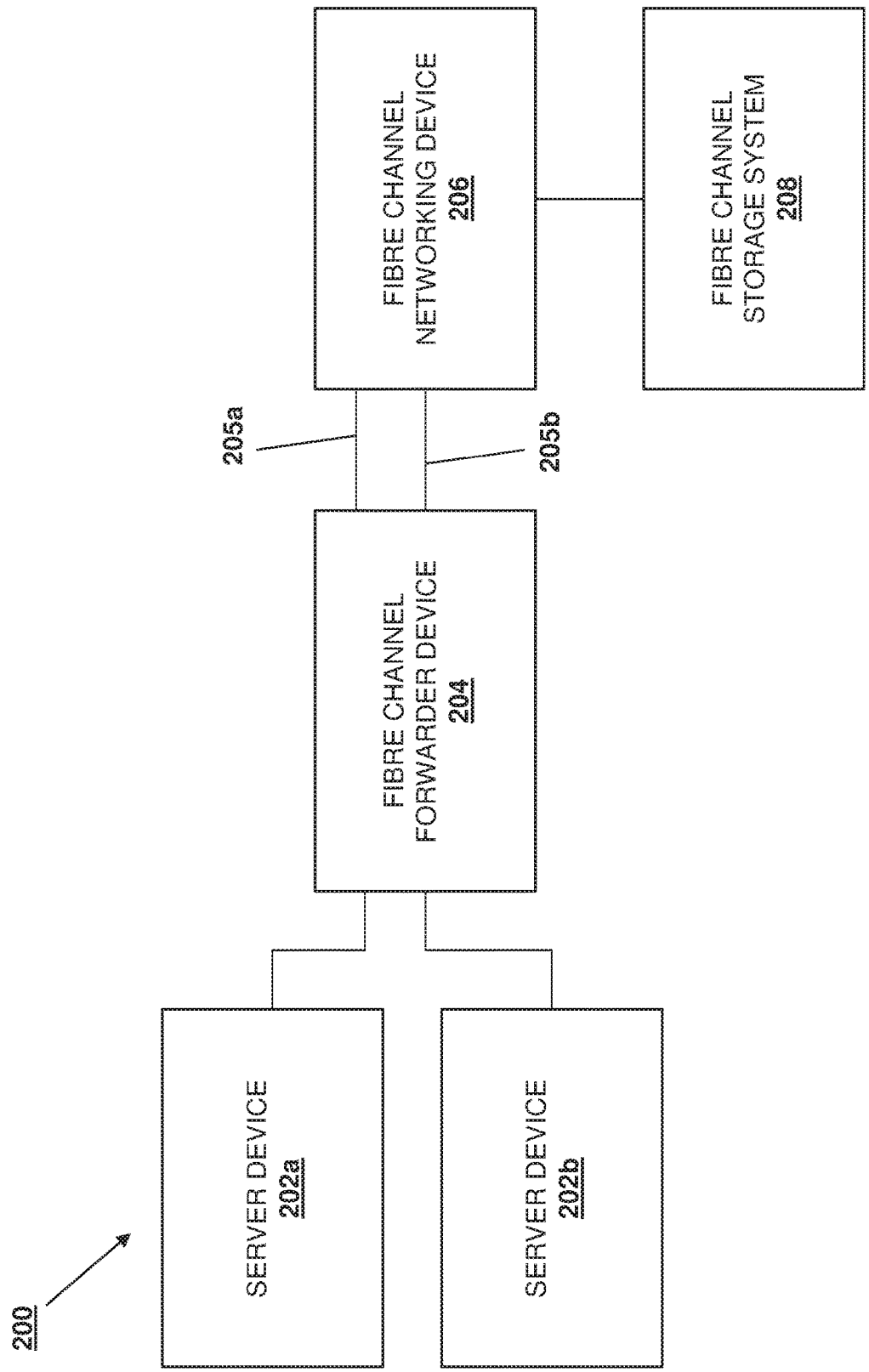
FIG. 2 is a schematic view illustrating an embodiment of a Fibre Channel Forwarder (FCF) load balancing system.

Referring now to FIG. 2, an embodiment of a Fibre Channel Forwarder (FCF) load balancing system 200 is illustrated. In the illustrated embodiment, the FCF load balancing system 200 includes a server device 202a that may be the IHS 100 discussed above with reference to FIG. 1 and/or that may include some or all of the components of the IHS 100. For example, the server device 202a may be one or more servers in a server rack or server chassis, and one of skill in the art in possession of the present disclosure will recognize that any number of servers may be provided in the FCF load balancing system 200 and may operate similarly to the server devices discussed below. In the illustrated embodiment, the server device 202a is coupled to a Fibre Channel Forwarder (FCF) device 204 that may be the IHS 100 discussed above with reference to FIG. 1 and/or that may include some or all of the components of the IHS 100. For example, the FCF device 204 may be provided by a switch or other networking device that is configured to receive Ethernet communications from the server device 202a, convert those Ethernet communications to Fibre Channel (FC) communications for forwarding to an FC Storage Area Network (SAN), receive FC communications from the FC SAN, convert those FC communications to Ethernet communications for forwarding to the server device 202a, and/or perform other FCF device functionality know in the art.

In the illustrated embodiment, the FCF device 204 is coupled by a plurality of links (e.g., a link 205a and a link 205b) to an FC networking device 206 that may be the IHS 100 discussed above with reference to FIG. 1 and/or that may include some or all of the components of the IHS 100. For example, the FC networking device 206 may be provided by a FC switch that is configured to receive FC communications (e.g., initialed by the server device 202a) from the FCF device 204, log the server device 202a into an FC SAN, subsequently receive FC communications (e.g., initialed by the server device 202a) from the FCF device 204 to allow the server device 202a to communicate with the FC SAN, and perform a variety of other FC networking device functionality that would be apparent to one of skill in the art in possession of the present disclosure. In the illustrated embodiment, the FC networking device 206 is coupled to an FC storage system 208 that may be the IHS 100 discussed above with reference to FIG. 1 and/or that may include some or all of the components of the IHS 100. For example, the FC storage system 208 may be provided by a FC SAN that is configured to receive FC communications from the server device 202a through the FC networking device 206, send FC communications to the server device 202a through the FC networking device 206, and/or perform a variety of other FC storage system functionality that would be apparent to one of skill in the art in possession of the present disclosure. While a specific FCF load balancing system 200 is illustrated and described below, one of skill in the art in possession of the present disclosure will recognize that the teachings of the present disclosure will be beneficial for a variety of FC systems that would be apparent to one of skill in the art in possession of the present disclosure and, as such, a wide variety of modifications to the number, types, and orientation of devices in the FCF load balancing system 200 will fall within the scope of the present disclosure as well. For example, as illustrated in FIG. 2, the FCF device 204 may be coupled to an additional server device 202b.

Figure 3:
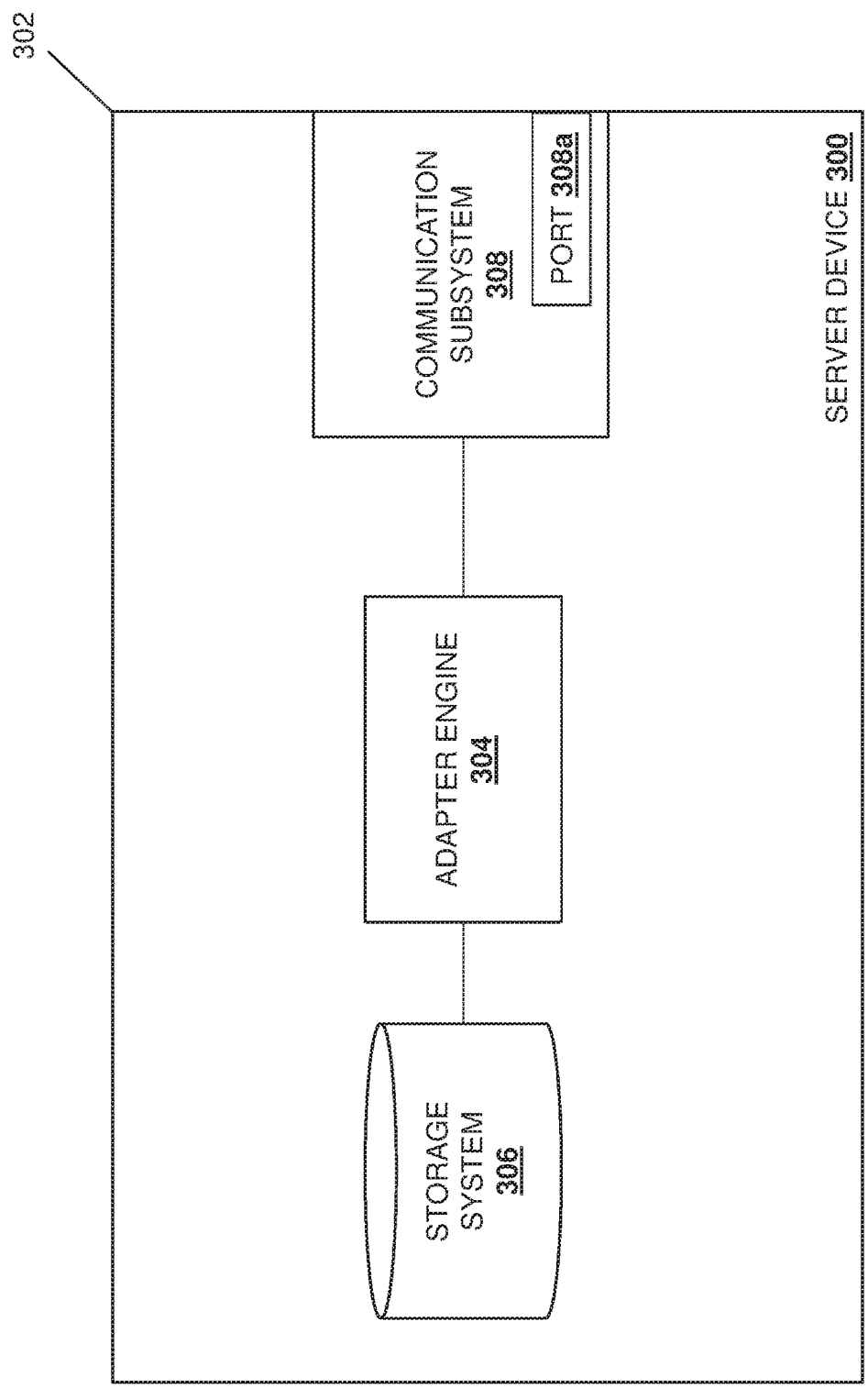
FIG. 3 is a schematic view illustrating an embodiment of a server device in the FCF load balancing system of FIG. 2.

Referring now to FIG. 3, an embodiment of a server device 300 is illustrated that may be the server devices 202a and 202b discussed above with reference to FIG. 2. As such, the server device 300 may be the IHS 100 discussed above with reference to FIG. 1 and/or may include some or all of the components of the IHS 100, and in specific examples may be one or more servers in a server rack or server chassis. In the illustrated embodiment, the server device 300 includes a chassis 302 that houses the components of the server device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an adapter engine 304 that is configured to perform the functions of the adapter engines and server devices discussed below.

The chassis 302 may also house a storage system (not illustrated, but which may include the storage device 108 discussed above with reference to FIG. 1) that is coupled to the adapter engine 304 (e.g., via a coupling between the storage system and the processing system) and that may include a storage subsystem 306 that is configured to store the data utilized as discussed below. However, in some embodiments the storage subsystem 306 may be omitted. The chassis 302 may also house a communication subsystem 308 that is coupled to the adapter engine 304 (e.g., via a coupling between the communication subsystem 308 and the processing system) and that may include a Network Interface Controller (NIC), a wireless communication devices, one or more ports (e.g., a port 308a), and/or other communication components that would be apparent to one of skill in the art in possession of the present disclosure. Furthermore, in some embodiments, components of the adapter engine 304 and/or the communication subsystem 308 may be provided by a Converged Network Adapter (CNA) that performs the functionality of the adapter engines and/or server devices discussed below. However, in other embodiments, the adapter engine 304 and/or communication subsystem 308 may be utilized to provide other types of adapters (e.g., Host Bus Adapters (HBAs)) while remaining within the scope of the present disclosure. While a specific server device 300 has been described, one of skill in the art in possession of the present disclosure will recognize that the server device 300 may include a variety of other components that perform conventional server device functionality, as well as the functionality described below, while remaining within the scope of the present disclosure.

Figure 4:
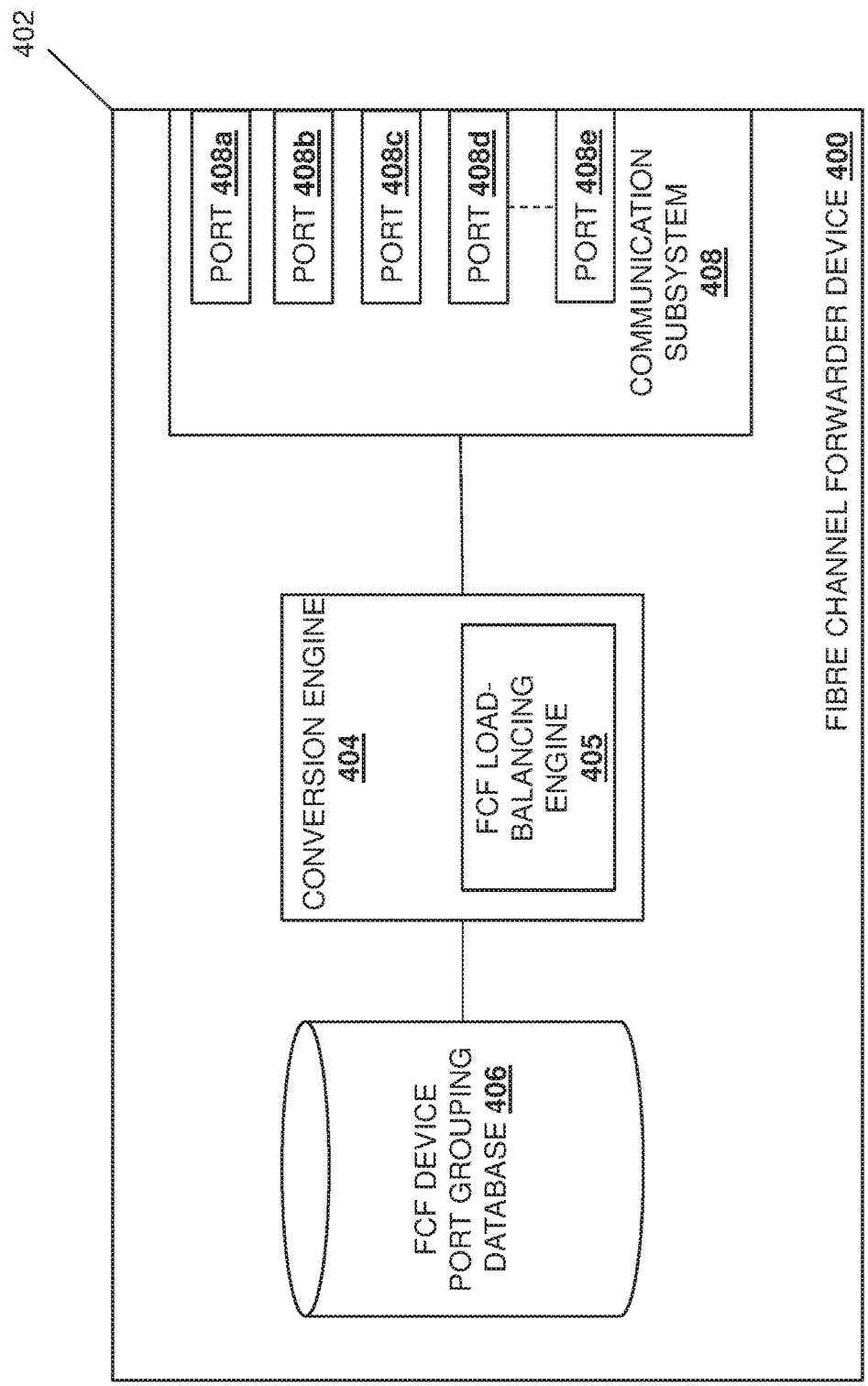
FIG. 4 is a schematic view illustrating an embodiment of an FCF device in the FCF load balancing system of FIG. 2.

Referring now to FIG. 4, an embodiment of a Fibre Channel Forwarder (FCF) device 400 is illustrated that may be the FCF device 204 discussed above with reference to FIG. 2. As such, the FCF device 400 may be the IHS 100 discussed above with reference to FIG. 1 and/or may include some or all of the components of the IHS 100, and in specific examples may be a switch, a gateway, or other networking device. In the illustrated embodiment, the FCF device 400 includes a chassis 402 that houses the components of the FCF device 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an conversion engine 404 that is configured to perform the functions of the conversion engines and FCF devices discussed below. In a specific example, the conversion engine 404 may include an N_Port ID Virtualization (NPIV) Proxy Gateway (NPG) engine that operates as discussed below, although other conversion engines may fall within the scope of the present disclosure as well. In another example, the conversion engine 404 may include an FCF load balancing engine 405 that is configured to perform the functions of the load balancing engines and FCF devices discussed below such as, e.g., grouping ports on the FCF device 400 and balancing traffic through those grouped ports.

The chassis 402 may also house a storage system (not illustrated, but which may include the storage device 108 discussed above with reference to FIG. 1) that is coupled to the conversion engine 404 (e.g., via a coupling between the storage system and the processing system) and that may include an FCF device port grouping database 406 that is configured to store the data utilized as discussed below. The chassis 402 may also house a communication subsystem 408 that is coupled to the conversion engine 404 (e.g., via a coupling between the communication subsystem 408 and the processing system) and that may include a Network Interface Controller (NIC), a wireless communication devices, ports, and/or other communication components that would be apparent to one of skill in the art in possession of the present disclosure. For example, in the illustrated embodiment, the communication subsystem 408 includes a plurality of ports (e.g., the ports 408a, 408b, 408c, 408d, and up to 408e) that may be coupled to an FC networking device, another FCF forwarder, and/or a server device as discussed below. Furthermore, in some embodiments, components of the conversion engine 404 and/or the communication subsystem 408 may provide an NPG that performs the functionality of the conversion engines and/or server devices discussed below. However, as discussed above, the conversion engine 404 may be utilized to provide for other types of conversions while remaining within the scope of the present disclosure. While a specific FCF device 400 has been described, one of skill in the art in possession of the present disclosure will recognize that the FCF device 400 may include a variety of other components that perform conventional FCF device functionality, as well as the functionality described below, while remaining within the scope of the present disclosure.

Figure 5:
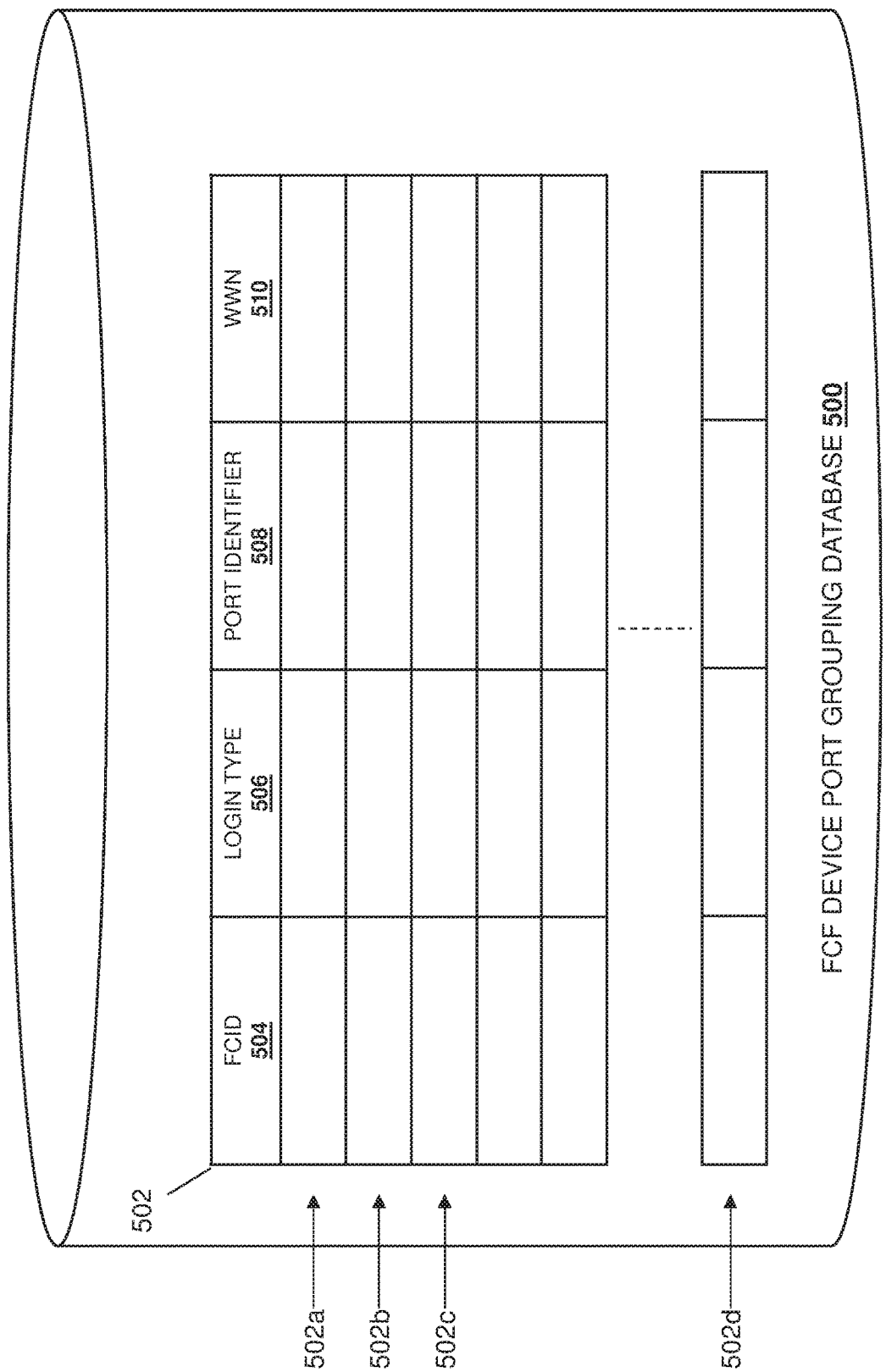
FIG. 5 is a schematic view illustrating an embodiment of an FCF device port grouping database in the FCF device of FIG. 2

Referring now to FIG. 5, an embodiment of an FCF device port grouping database 500 is illustrated. In an embodiment, the FCF device port grouping database 500 may be the FCF device port grouping database 406 discussed above with reference to FIG. 4. In a specific example, the FCF device 204 and the FC networking device 206 may utilize a link aggregation protocol and the FCF device port grouping database 500 may include an FCF virtual trunk instance map that includes information about ports in a trunk group that may be defined by FC virtual trunking, as discussed below. However, one of skill in the art in possession of the present disclosure will recognize that other link aggregation protocols will fall within the scope of the present disclosure as well. In the illustrated example, the FCF device port grouping database 500 includes an FCF device virtual trunk instance mapping table 502 having mapping table entries 502a, 502b, 502c, and up to 502d. For example, for each FCF virtual trunk instance mapping table entry 502a-d, the mapping table 502 may include a Fibre Channel (FC) identifier (FCID) column 504, a login type column 506, a port identifier column 508, and a FC networking device identifier column 510. However, one of skill in the art in possession of the present disclosure will recognize that the FCF device port grouping database 500 and/or the FCF device virtual trunk instance mapping table 502 may include and/or store other information to enable the functionality discussed below while remaining within the scope of the present disclosure.

Figure 6:
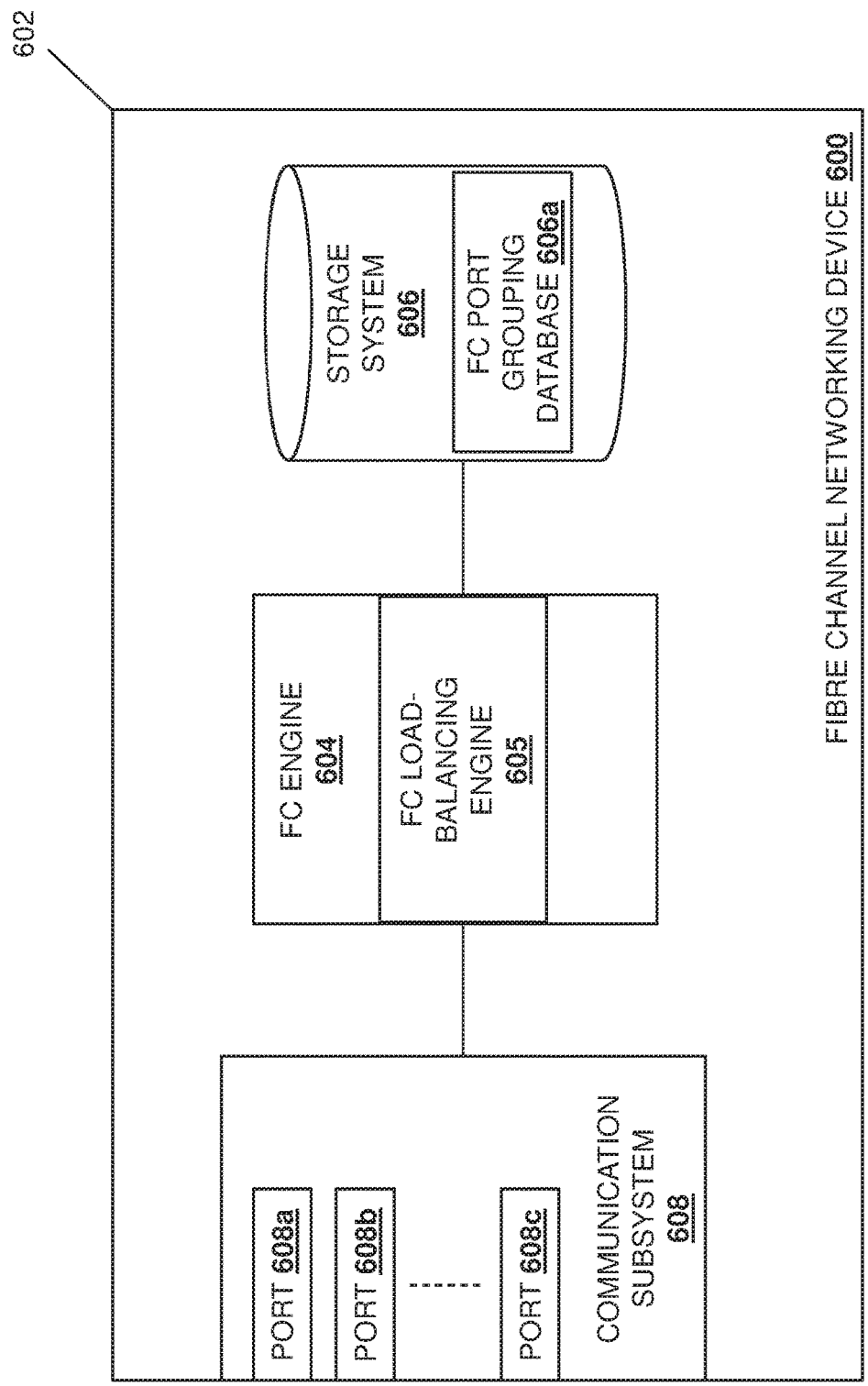
FIG. 6 is a schematic view illustrating an embodiment of an FC networking device in the FCF port configuration system of FIG. 2.

Referring now to FIG. 6, an embodiment of a Fibre Channel (FC) networking device 600 is illustrated that may be the FC networking device 206 discussed above with reference to FIG. 2. As such, the FC networking device 600 may be the IHS 100 discussed above with reference to FIG. 1 and/or may include some or all of the components of the IHS 100, and in specific examples may be an FC switch. In the illustrated embodiment, the FC networking device 600 includes a chassis 602 that houses the components of the FC networking device 600, only some of which are illustrated in FIG. 6. For example, the chassis 602 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an FC engine 604 that is configured to perform the functions of the FC engines and FC networking devices discussed below. In another example, the FC engine 604 may include an FC load balancing engine 605 that is configured to perform the functions of the load balancing engines and FC networking devices discussed below such as grouping ports on the FC networking device 600 and balancing traffic through those grouped ports.

The chassis 602 may also house a storage system (not illustrated, but which may include the storage device 108 discussed above with reference to FIG. 1) that is coupled to the FC engine 604 (e.g., via a coupling between the storage system and the processing system) and that may include an FC networking device port grouping database 606 that is configured to store the data utilized as discussed below. The chassis 602 may also house a communication subsystem 608 that is coupled to the FC engine 604 (e.g., via a coupling between the communication subsystem 608 and the processing system) and that may include a Network Interface Controller (NIC), a wireless communication devices, ports, and/or other communication components that would be apparent to one of skill in the art in possession of the present disclosure. For example, in the illustrated embodiment, the communication subsystem 608 includes a plurality of ports 608a, 608b, and up to 608c, that may be coupled to an FCF device as well as an FC SAN (e.g., the FC storage system 208), as discussed herein. While a specific FC networking device 600 has been described, one of skill in the art in possession of the present disclosure will recognize that the FC networking device 600 may include a variety of other components that perform conventional FC networking device functionality, as well as the functionality described below, while remaining within the scope of the present disclosure.

Figure 7:
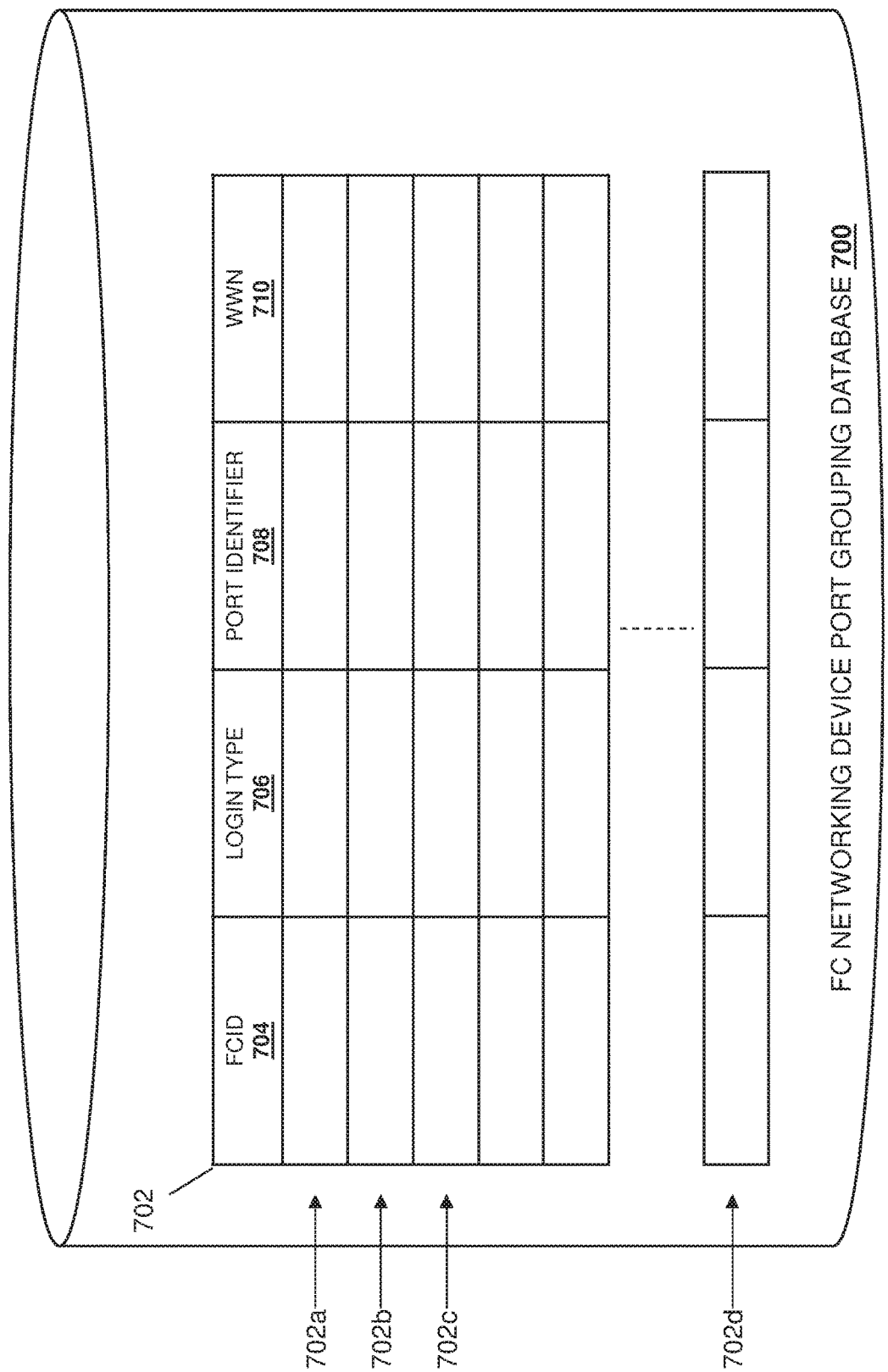
FIG. 7 is a schematic view illustrating an embodiment of an FC networking device port grouping database in the FC networking device of FIG. 2.

Referring now to FIG. 7, an embodiment of an FC networking device port grouping database 700 is illustrated. In an embodiment, the FC networking device port grouping database 700 may be the FC networking device port grouping database 606 discussed above with reference to FIG. 6. In a specific example, and as discussed above, the FCF device 204 and the FC networking device 206 may utilize a link aggregation protocol, and the FC networking device port grouping database 700 may include an FC networking device virtual trunk instance map that includes information about ports in a trunk group that may be defined by FC virtual trunking, as discussed below. However, one of skill in the art in possession of the present disclosure will recognize that other link aggregation protocols will fall within the scope of the present disclosure as well. In the illustrated example, the FC networking device port grouping database 700 includes an FC networking device virtual trunk instance mapping table 702 having mapping table entries 702a, 702b, 702c, and up to 702d. For example, for each FC networking device virtual trunk instance mapping table entry 702a-d, the mapping table may include a Fibre Channel (FC) identifier (FCID) column 704, a login type column 706, a port identifier column 708, and a FCF identifier column 710. However, one of skill in the art in possession of the present disclosure will recognize that the FC networking device port grouping database 700 and/or the FC networking device virtual trunk instance mapping table 702 may include and/or store other information to enable the functionality discussed below while remaining within the scope of the present disclosure.

Figure 8:
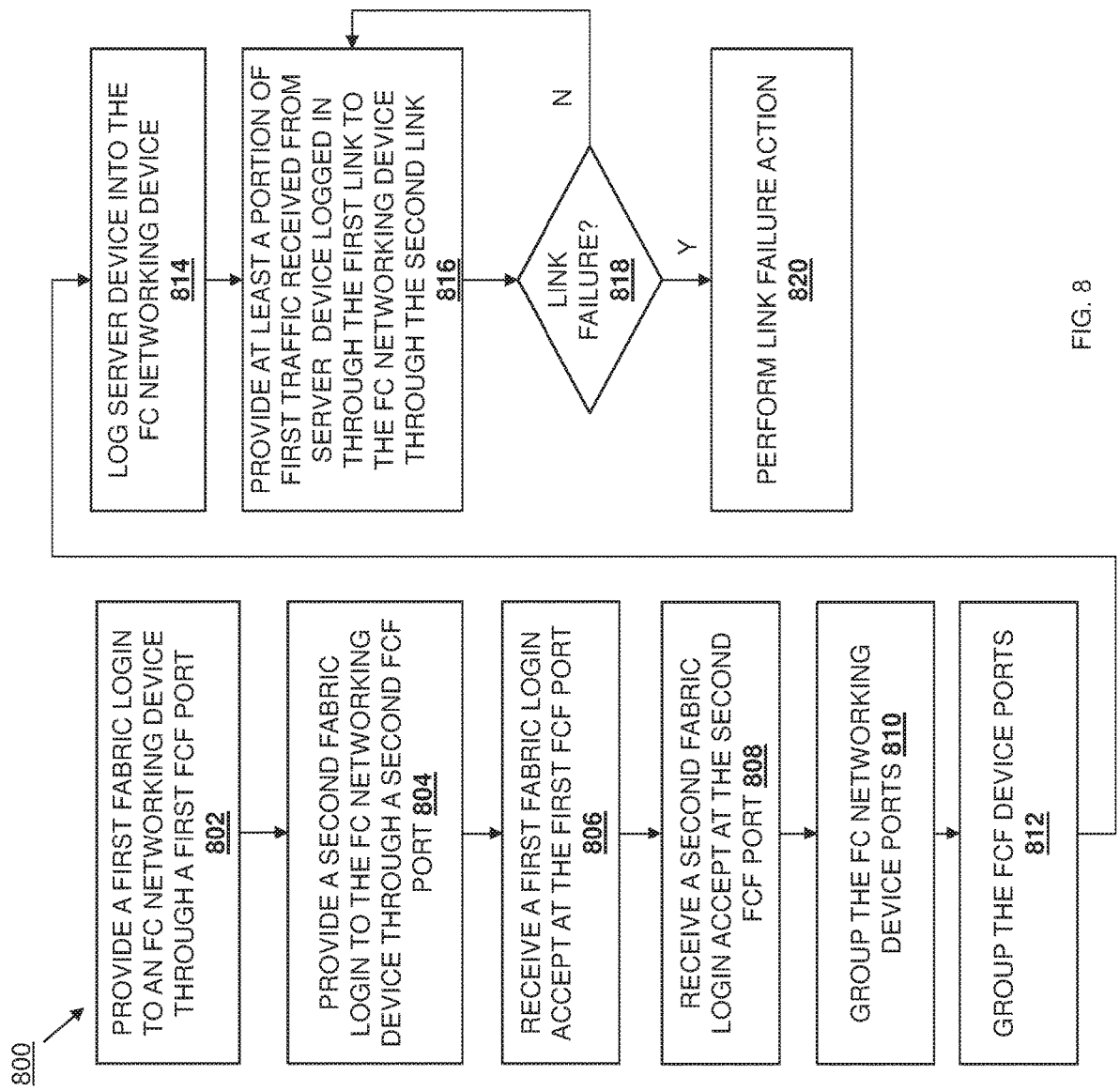
FIG. 8 is a flow chart illustrating an embodiment of a method for FCF load balancing.

Referring now to FIG. 8, an embodiment of a method 800 for FCF load balancing is illustrated. As discussed above, when a server establishes a virtual link through a physical link between a FCF device and a FC networking device, traffic to and from that server is provided over the physical link through which that server is logged in, even though there may be other physical links between the FCF device and the FC networking device through which that traffic may be provided. This results in uneven traffic balancing between the FCF device and the FC networking device, and/or underutilization of available bandwidth. The systems and method of the present disclosure remedy these deficiencies by grouping the physical links as a single link such that the traffic may be load balanced among the physical links of that group. For example, the FC networking device may group the FC networking device ports together based on the node FCF identifier present in a fabric login (FLOGI) received at each port, while the FCF device may group the FCF device ports together based on the FC networking device identifier provided in a FLOGI accept (FLOGI ACC). The FCF device and the FC networking device may then use the grouped ports to load balance traffic among the member of the group.

Figure 9:
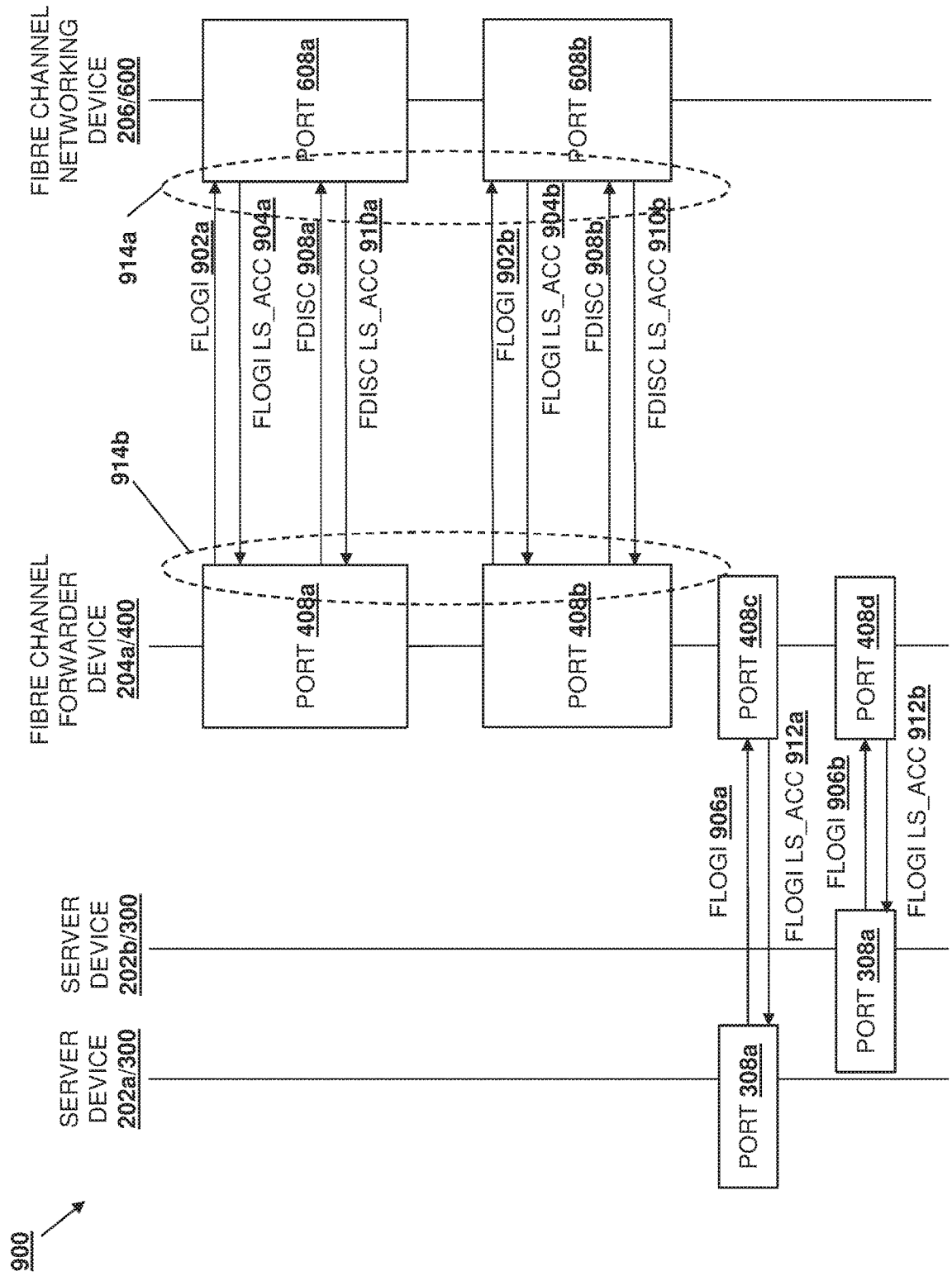
FIG. 9 is a diagram illustrating an embodiment of the FCF load balancing during the method of FIG. 8.

The method 800 begins at block 802 where an FCF device provides a first fabric login to an FC networking device through a first FCF port. In an embodiment of block 802 and with reference to a FCF load balancing diagram 900 in FIG. 9, the conversion engine 404 of the FCF device 204 may transmit a FLOGI 902a through its port 408a to the port 608a of the FC networking device 206 via a link initialized between the ports 408a and 608a. The FLOGI 902a may include FCF device information about the FCF device 204, and FCF device port information about the port 408a. For example, the FLOGI 902a may include an FCF device identifier such as, for example, a node worldwide name (NWWN). The FLOGI 902a may also include an FCF port identifier for the port 408a such as, for example, a port worldwide name (PWWN), and/or any other FCF device information and/or FCF port information that would be apparent to one of skill in the art in possession of the present disclosure.

The method 800 then proceeds to block 804 where the FCF device provides a second fabric login to the FC networking device through a second FCF port. In an embodiment of block 804 and with reference to the FCF load balancing diagram 900 in FIG. 9, the FCF device 204 may transmit a FLOGI 902b through its port 408b to the port 608b of the FC networking device 206. The FLOGI 902b may include FCF device information about the FCF device 204, and FCF device port information about the port 408b. For example, the FLOGI 902b may include an FCF device identifier such as, for example, an NWWN. In an embodiment, the NWWN provided in the FLOGI 902b may be the same as the NWWN provided in the FLOGI 902a. The FLOGI 902b may also include an FCF port identifier of the port 608b such as, for example, a PWWN, and/or any other FCF device information and/or FCF port information that would be apparent to one of skill in the art in possession of the present disclosure.

The method 800 then proceeds to block 806 where the FC networking device provides a first fabric login accept through a first FC networking device port, and the FCF device 204 receives that first fabric login accept via its first FCF port (i.e., in response to sending the first fabric login at block 802.) In an embodiment of block 806 and with reference to the FCF load balancing diagram 900 in FIG. 9, the FC networking device 206 provides a first FLOGI link service accept (FLOGI LS_ACC) 904a through its port 608a to the port 408a of the FCF device 204 in response to the received FLOGI 902a. One of skill in the art in possession of the present disclosure will recognize that block 806 of method 800 may be performed before block 804 (i.e., the first fabric login accept may be received before the second fabric login is sent.) The FLOGI LS_ACC 904a may include FC networking device information about the FC networking device 206. For example, the FLOGI LS_ACC 904a may include an FC networking device identifier such as, for example, a fabric worldwide name (FWWN). The FLOGI LS_ACC 904a may also include a Fibre Channel (FC) identifier (FCID) that the FC networking device 206 assigns to the node port (N_Port) port 408a. As would be understood by one of skill in the art in possession of the present disclosure, the FCID for the port 408a may be a unique identifier within the FC SAN for that port 408a. While specific FC networking device information is discussed above, one of skill in the art in possession of the present disclosure would recognize that other FC networking device information may be provided with the FLOGI LS_ACC 904a without departing from the scope of the present disclosure.

The method 800 then proceeds to block 808 where the FC networking device provides a second fabric login accept through a second FC networking device port, and the FCF device 204 receives that second fabric login accept via its second FCF port (i.e., in response sending to the second fabric login at block 804.) In an embodiment of block 808 and with reference to the FCF load balancing diagram 900 in FIG. 9, the FC networking device 206 provides a second FLOGI LS_ACC 904b through its port 608b to the port 408b of the FCF device 204 in response to the received FLOGI 902b. The FLOGI LS_ACC 904b may include FC networking device information about the FC networking device 206. For example, the FLOGI LS_ACC 904b may include an FC networking device identifier such as, for example, a FWWN. In an embodiment, the FWWN provided with the FLOGI LS_ACC 904b may be the same FWWN provided with the FLOGI LS_ACC 904a. The FLOGI LS_ACC 904b may also include an FCID that the FC networking device 206 assigns to the N_Port (e.g., port 408b). While specific FC networking device information is discussed above, one of skill in the art in possession of the present disclosure would recognize that other FC networking device information may be provided with the FLOGI LS_ACC 904b without departing from the scope of the present disclosure.

Figure 10A:
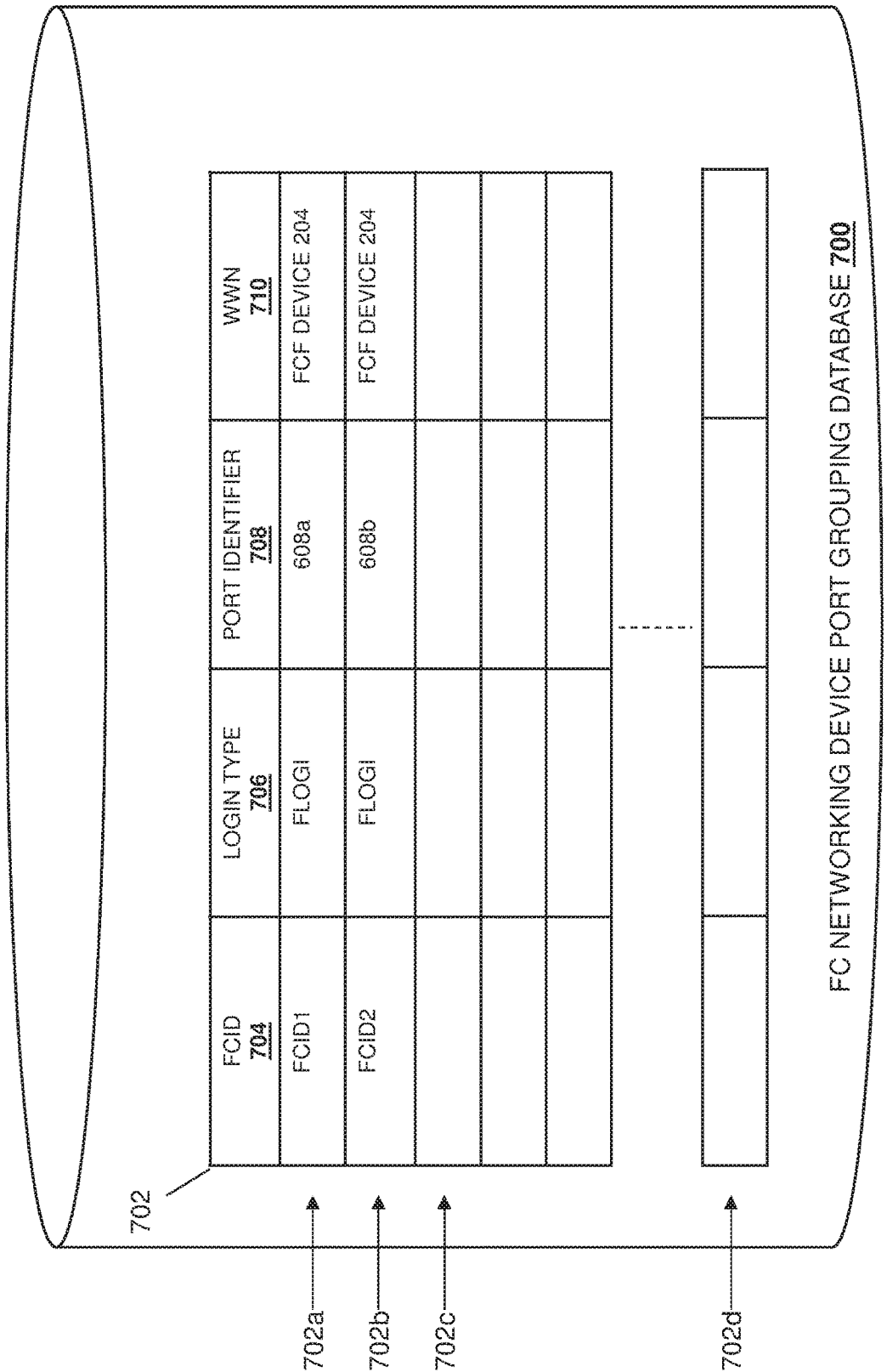
FIG. 10A is a schematic view illustrating an embodiment of information being provided in the FC networking device port grouping database of FIG. 7 during the method of FIG. 8.

The method 800 then proceeds to block 810 where the FC networking device groups the first FC networking device port and the second FC networking device port. In an embodiment of block 810 and with reference to the FCF load balancing diagram 900 of FIG. 9, the FC networking device 206 may group its ports 608a and 608b as a trunk group 914a (e.g., as defined by FC virtual trunking, discussed above) based on, for example, the NWWN received with the FLOGI 902a and the NWWN received with the FLOGI 902b being the same. The trunk group 914a may be stored in the FC networking device port grouping database 606. In an embodiment, and with reference to the FC networking device port grouping database 700 of FIG. 10A, the FC networking device 206 may create a virtual trunk instance that maps the FCIDs assigned to the N_Port via the trunk group 914a, login types (e.g., FLOGI or fabric discovery (FDISC)), and the NWWN to the ports of the trunk group 914a. The FC networking device virtual trunk instance mapping table 702 illustrates an example of the FC networking device virtual trunk instance map. For example, row 702a of the FC networking device virtual trunk instance mapping table 702 illustrates how the FC load balancing engine 605 may operate to associate the trunk group 914a with a virtual trunk instance by associating the port 608a to the first FCID ("FCID1") assigned to port 408a, which is a "FLOGI" login type and has an NWWN of the FC device 204. Furthermore, row 702b of the FC networking device virtual trunk instance mapping table 702 illustrates how the FC load balancing engine 605 may also associate the port 608b with the second FCID ("FCID2") assigned to port 408b, which is a "FLOGI" login type and has an NWWN of the FCF device 204.

The method 800 then proceeds to block to block 812 where the FCF device groups the first FCF device port and the second FCF device port. In an embodiment of block 812 and with reference to the FCF load balancing diagram 900 of FIG. 9, the FCF device 204 may group the ports 408a and 408b as a trunk group 914b (e.g., as defined by FC virtual trunking, discussed above) based on, for example, the FWWN received with the FLOGI LS_ACC 904a and the FWWN received with the FLOGI LS_ACC 904b being the same. The trunk group 914b may be stored in the FCF device port grouping database 406. In an embodiment, and with reference to the FCF device port grouping database 500 of FIG. 11A, the FCF device 204 may map the FCIDs assigned to the N_Ports in the trunk group 914b, associated login types (e.g., FLOGI or FDISC), and the FWWN to the ports of the trunk group 914b. The FCF device virtual trunk instance mapping table 502 illustrates an example of the FCF device virtual trunk instance map. For example, row 502a of the FCF device virtual trunk instance mapping table 502 illustrates how the FCF load balancing engine 405 may operate to associate the trunk group 914b with the virtual trunk instance described above, by associating the port 408a to the first FCID ("FCID1") assigned to port 408a, which is a "FLOGI" login type and has an FWWN of the FC networking device 206, and associating the port 408b to the second FCID ("FCID2") assigned to port 408b, which is a "FLOGI" login type and corresponds to an FWWN of the FC networking device 206.

The method 800 then proceeds to block 814 where a server device logs into the FC networking device via the FCF device. In an embodiment of block 814 and with reference to the FCF load balancing diagram 900 of FIG. 9, one or more server device (e.g., server device 202a and/or 202b) may login to the FC SAN via the FCF device 204. For example, the adapter engine 304 of the server device 202a may provide, through the port 308a (which may be an N_Port), a FLOGI 906a to the port 408c (which may be an F_Port) of the FCF device 204. The FLOGI 906a may include server device information about the server device 202a, and server device port information about the port 308a. For example, the FLOGI 906a may include a server device identifier such as, for example, a NWWN. The FLOGI 906a may also include a server port identifier for the port 308a such as, for example, a PWWN and/or any other server device information and/or server device port information that would be apparent to one of skill in the art in possession of the present disclosure.

The FCF load balancing engine 405 may then determine through which of the N_Ports (e.g., ports 408a and 408b) the server device 202a should log into the FC networking device. For example, the FCF load balancing engine 405 may use login based load balancing to determine which of ports 408a and 408b has the fewest number of login sessions, or may use any other login based load balancing technique that would be apparent to one of skill in the art in possession of the present disclosure. In the illustrated example of FIG. 9, the FCF load balancing engine 405 may determine that the FLOGI 906a should be serviced by the link between port 408a and port 608a. The conversion engine 404 may then generate an FDISC 908a that includes FCF device information about the FCF device 204 and server device port information about the port 308a. For example, the FDISC 908a may include an FCF device identifier such as, for example, a NWWN. The FDISC 908a may also include a server port identifier for the port 308*a* such as, for example, a PWWN and/or any other FCF device information and/or server device information that would be apparent to one of skill in the art in possession of the present disclosure.

The FC networking device 206 then provides a first FDISC link service accept (FDISC LS_ACC) 910*a* through the port 608*a* to the port 408*a* in response to the received FDISC 908*a*. The FDISC LS_ACC 908*a* may include FC networking device information about the FC networking device 206. For example, the FDISC LS_ACC 908*a* may include an FC networking device identifier such as, for example, an FWWN. The FDISC LS_ACC 908*a* may also include an FCID that the FC networking device 206 assigns to the N_Port (e.g., port 308*a*). The conversion engine 404 may generate a FLOGI LS_ACC 912*a* that is provided through the port 408*c* to the port 308*a*. The FLOCI LS_ACC 912*a* may include the FCID, the FWWN, and/or any other FCF device information or FC networking device information that would be apparent to one of skill in the art in possession of the present disclosure.

Similarly, the adapter engine 304 of the server device 202*b* may provide, through the port 308*a* (which may be an N_Port), a FLOGI 906*b* to the port 408*d* (which may be an F_Port) of the FCF device 204. The FLOGI 906*b* may include server device information about the server device 202*b* and server device port information about the port 308*a*. For example, the FLOGI 906*b* may include a server device identifier such as, for example, a NWWN. The FLOGI 906*b* may also include a server port identifier for the port 308*a* such as, for example, a PWWN and/or any other server device information and/or server device port information that would be apparent to one of skill in the art in possession of the present disclosure.

The FCF load balancing engine 405 may then determine which of N_Ports (e.g., ports 408*a* and 408*b*) the server device 202*a* should utilize to login. For example, the FCF load balancing engine 405 may use login based load balancing to determine which port of ports 408*a* and 408*b* has the fewest number of login sessions, or may use any other login based load balancing technique that would be apparent to one of skill in the art in possession of the present disclosure. In the illustrated example of FIG. 9, the FCF load balancing engine 405 may determine that the FLOGI 906*b* should be serviced by the link between the port 408*b* and the port 608*b*. The conversion engine 404 may then generate an FDISC 908*b* that includes FCF device information about the FCF device 204 and server device port information about the port 308*a* of the server device 202*b*. For example, the FDISC 908*b* may include an FCF device identifier such as, for example, the NWWN. The FDISC 908*b* may also include a server port identifier for the port 308*a* of the server device 202*b* such as, for example, a PWWN and/or any other FCF device information and/or server device information that would be apparent to one of skill in the art in possession of the present disclosure.

The FC networking device 206 then provides a second FDISC LS_ACC 910*b* through the port 608*b* to the port 408*b* in response to the received FDISC 908*b*. The FDISC LS_ACC 908*b* may include FC networking device information about the FC networking device 206. For example, the FDISC LS_ACC 908*b* may include an FC networking device identifier (e.g., the FWWN). The FDISC LS_ACC 908*b* may also include an FCID that the FC networking device 206 assigns to the port 308*a* of the server device 202*b*. The conversion engine 404 may generate a FLOGI LS_ACC 912*b* that is provided through the port 408*d* to the port 308*a* of the server device 202*b*. The FLOCI LS_ACC 912*b* may include the FCID, the FWWN, and/or any other FCF device information and/or FC networking device information that would be apparent to one of skill in the art in possession of the present disclosure.

In an embodiment, and with reference to the FC networking device port grouping database 700 of FIG. 10B, the FC networking device 206 may map, to the virtual trunk instance, the FCIDs assigned to the N_Ports of the server devices 202*a* and 202*b*, login types (e.g., FLOGI or FDISC)), and the NWWN to the ports of the trunk group 914*a*. The FC networking device virtual trunk instance mapping table 702 illustrates an example of the FC networking device virtual trunk instance map. For example, row 702*c* of the FC networking device virtual trunk instance map illustrates how the FC load balancing engine 605 may operate to associate the trunk group 914*a* with a virtual trunk instance by associating the virtual trunk instance with the third FCID ("FCID3") assigned to port 308*a* of server device 202*a*, which is a "FDISC" login type and has an NWWN of the FCF device 204. The FC networking device virtual trunk instance map in FIG. 10B also illustrates how the FC load balancing engine 605 may associate the virtual trunk instance to the fourth FCID ("FCID4") assigned to port 308*a* of the server device 202*b*, which is an "FDISC" login type and has an NWWN of the FCF device 204.

Figure 11A:
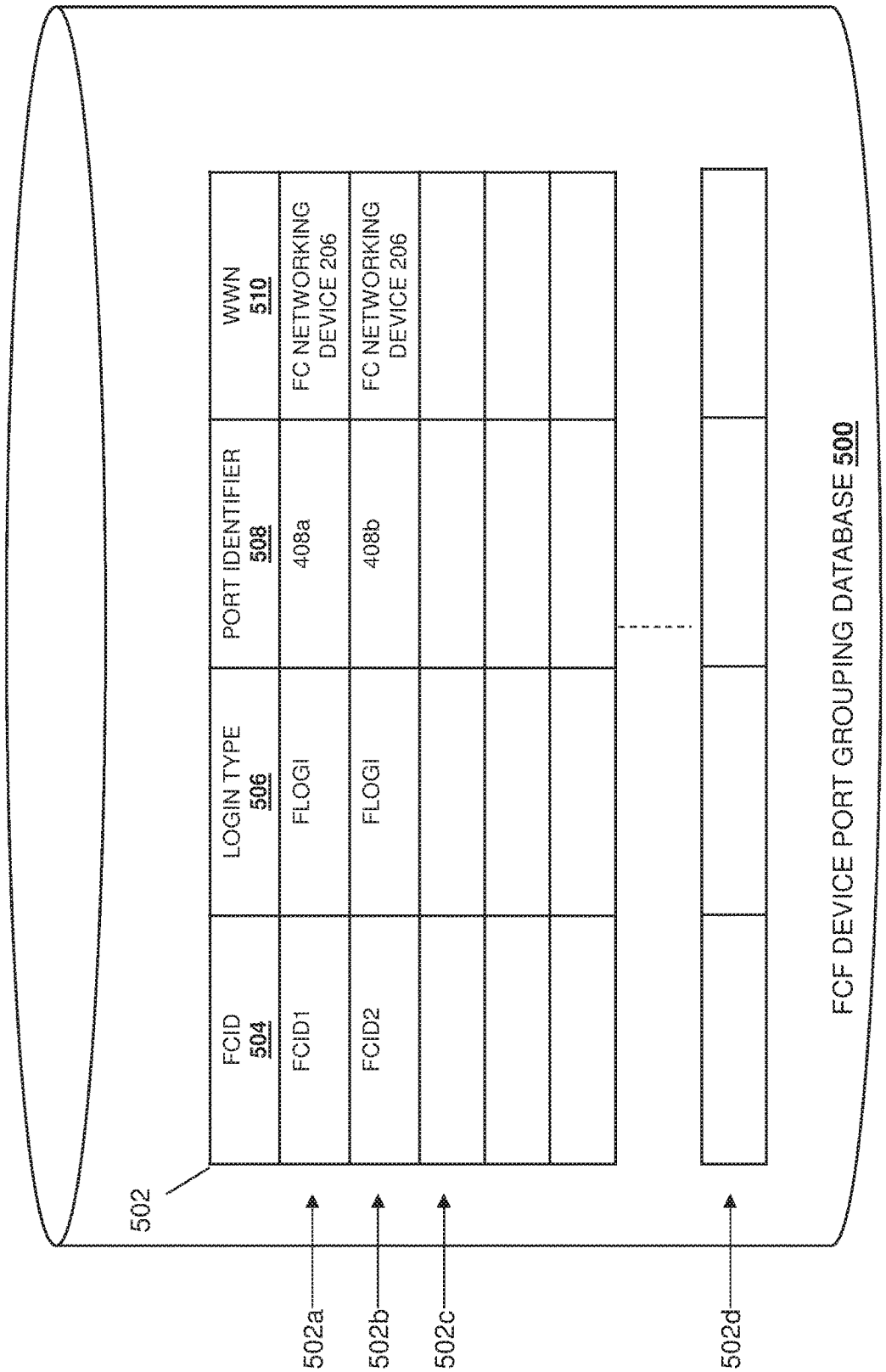
FIG. 11A is a schematic view illustrating an embodiment of information being provided in the FCF device port grouping database of FIG. 5 during the method of FIG. 8.
Figure 11B:
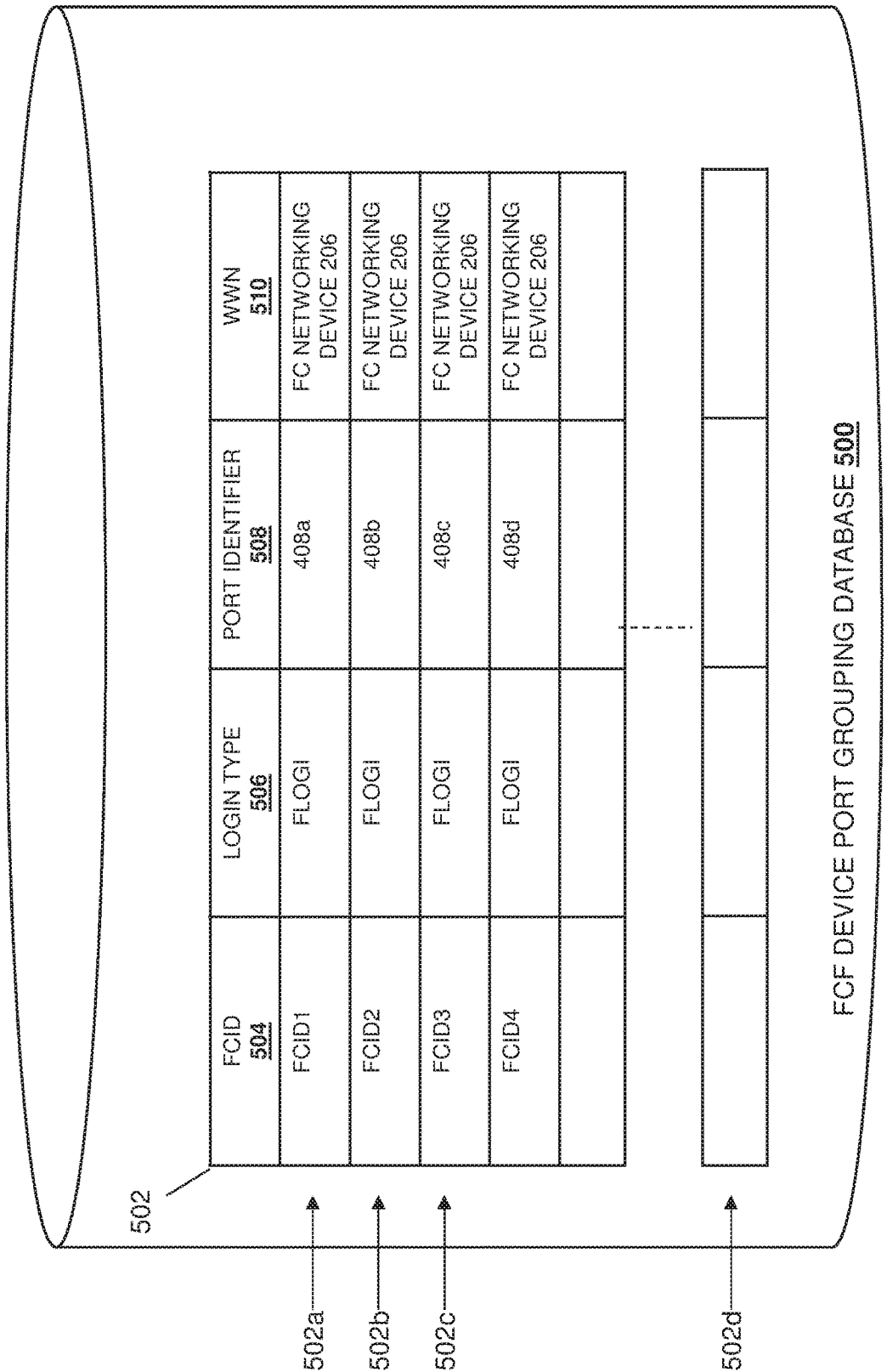
FIG. 11B is a schematic view illustrating an embodiment of information being provided in the FCF device port grouping database of FIG. 5 during the method of FIG. 8.

In an embodiment and referring to the FCF device port grouping database 500 of FIG. 11A, the FCF device 204 may map in the FCF device virtual trunk instance the FCIDs assigned to the N_Ports of the server devices 202*a* and 202*b* in the trunk group 914*b*, associated login types (e.g., FLOGI or FDISC), and the FWWN to the ports of the trunk group 914*b*. The FCF device virtual trunk instance mapping table 502 illustrates the FCF device virtual trunk instance map. For example, row 502*c* of the FC networking device virtual trunk instance map illustrates how the FCF load balancing engine 405 may associate the port 408*c* with a third FCID ("FCID3") assigned to port 308*a* of server device 202*a*, which is a "FLOGI" login type and has the FWWN of the FC networking device 206. The FCF device virtual trunk instance map in FIG. 11B also illustrates how the FCF load balancing engine 405 may associate the port 408*d* to the fourth FCID ("FCID4") assigned to port 308*a* of server device 202*b*, which is a "FLOGI" login type and corresponds with the FWWN of the FC networking device 206.

The method 800 then proceeds to block 816 where at least a portion of first traffic, which is received from the first server device that is logged in through the first link to the FC networking device, is provided through the second link to the FC networking device. In embodiment of block 816, the FCF device 204 may receive first traffic from the server device 202*a* and/or second traffic from server device 202*b*. The conversion engine 404 may then convert the first traffic and/or the second traffic from a first protocol to a second protocol. For example, the conversion engine 404 may receive Ethernet communications from the server device 202*a* and/or 202*b*, and convert those Ethernet communications to Fibre Channel (FC) communications for forwarding to the FC SAN. The FCF load balancing engine 405 may also load balance the first traffic over any of the ports 408*a* and 408*b* in the trunk group 914*b*. For example, the FCF load balancing engine 405 may hash the first traffic among the ports 408*a* and 408*b* of the trunk group 914*b*, and/or perform any other load balancing algorithm that would be apparent to one of skill in the art in possession of the present disclosure. The FC networking device 206 may then forward the first traffic received at the ports 608a and 608b to the destination in the FC storage system 208.

Similarly, any traffic that is being provided by the FC networking device 206 to the server device 202a that is logged in to the FC networking device 206 though the link on the ports 408a and 608a may be load balanced by the FC load balancing engine 605 such that the traffic is provided over the link on ports 408a and 608a. and provided over the link on ports 408b and 608b, according to the trunk group 914a. The FCF device 204 receives the traffic, converts the traffic to a protocol the FCF device 204 can use to communicate with the server device 202a, and provides the traffic to the server device 202a over the link between port 408c and port 308a of server device 202a.

The method 800 may then proceed to decision block 818 where it is determined whether a link failure has occurred on the trunk group. In an embodiment of decision block 818, if a link failure has not occurred the method 800 may return to block 816 where traffic is provided between the server device(s) 202a and/or 202b and the FC networking device 206. If, at decision block 8181, it is determined that a link failure has occurred to a link of the trunk group, the method 800 may proceed to block 820 where a link failure action is performed to the trunk group. In an embodiment of block 820, when only a trunk group has been established that groups the ports 408a and 408b at the FCF device 204 and groups the ports 608a and 608b at the FC networking device 206, and a link failure occurs, then sessions/logins that are provided via that link will end. For example, if the link between ports 408a and 608a fails, then the ability of the server device 202a to login through the link between ports 408a and 608b will be removed, and a re-login may occur at the link between ports 408b and 608b (which is still active.)

In an embodiment of block 820, when a virtual trunk instance is established and a link failure is detected, only the FLOGI of the corresponding port will be removed from the virtual trunk instance. As such, all other FCIDs may remain intact because the virtual trunk instance is still active. Thus, the virtual trunk instance may only be down if all of the ports of the trunk group are down (e.g., the links on ports 408a and 408b of trunk group 914b have failed.) For example, if the link between ports 408a and 608a goes down, the FC load balancing engine 605 may remove the FC networking device virtual trunk instance mapping table entry 702a for the first FCID (FCID1), which corresponds with the FLOGI 902a provided by port 408a, from the FC networking device virtual trunk instance mapping table 702, and all other entries may remain in the FC networking device virtual trunk instance mapping table 702. Similarly, the FCF load balancing engine 405 may remove the FCF device virtual trunk instance mapping table entry 502a for the first FCID (FCID1), which corresponds with the FLOGI 902a provided by port 408a, from the FCF device virtual trunk instance mapping table 502, and all other entries may remain in the FCF device virtual trunk instance mapping table 502. In such a scenario, the server device 202a that logged in through the link between ports 408a and 608a does not have to re-login through another link because it is mapped to the virtual trunk instance. Therefore, the FCF load balancing engine 405 may continue to provide traffic between the server device 202a and the FC networking device 206 through the link between ports 408b and 608b.

Thus, systems and methods have been described that provide for FCF load balancing by grouping physical links between and FC networking device and an FCF device as a single link such that traffic may be load balanced among the links of that group. The FC networking device may group the FC networking device ports together based on the node FCF identifier present in a FLOGI received at each FC networking device port. Similarly, the FCF device may group the FCF device ports together based on the FC networking device identifier provided in a FLOGI ACC. The FCF device and the FC networking device may use the grouped ports to load balance traffic among the links of the group, which provides more even traffic balancing and utilization of available bandwidth on other physical links between the FCF device and the FC networking device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Fibre Channel Forwarder (FCF) load balancing system, comprising:
 a Fibre Channel (FC) networking device;
 a first server device; and
 an FC Forwarder (FCF) device that is coupled to the FC networking device and the first server device, wherein the FCF device is configured to:
  group a first link between the FC networking device and the FCF device with a second link between the FC networking device and the FCF device in response to receiving both a first fabric login accept on the first link that includes a first Worldwide Name (WWN) associated with the FC networking device and a second fabric login accept on the second link that includes the first WWN associated with the FC networking device as a first trunk group,
   wherein the receiving the first fabric login accept completes a first fabric login between the FCF device and the FC networking device via the first link, and wherein the receiving the second fabric login accept completes a second fabric login between the FCF device and the FC networking device via the second link;
  receive a third fabric login request from the first server device;
  select the first link over the second link through which to log the first server device into the FC networking device based on the third fabric login request;
  establish a third fabric login between the first server device and the FC networking device via the FCF device and the first link between the FC networking device and the FCF device; and
  provide at least a portion of first traffic, received from the first server device that is only logged in to the FC networking device through the first link between the FC networking device and the FCF device, through the second link between the FC networking device and the FCF device when the first link and the second link are in the first trunk group.

2. The FCF load balancing system of claim 1, wherein the FCF device is further configured to:
 establish a fourth fabric login between the first server device and the FC networking device via the FCF device and the second link between the FC networking device and the FCF device when the first link is not available.

3. The FCF load balancing system of claim 1, wherein the FCF device is further configured to:
  group, subsequent to the grouping of the first link and the second link, a third link between the FC networking device and the FCF device with the first link and the second link in response to receiving a third fabric login accept on the third link that includes the first WWN associated with the FC networking device such that the third link is added to the first trunk group, wherein the receiving the third fabric login accept completes a fourth fabric login that is between the FCF device and the FC networking device via the third link.

4. The FCF load balancing system of claim 1, wherein the FC networking device is configured to:
  group the first link between the FC networking device and the FCF device with the second link between the FC networking device and FCF device as a second trunk group in response to receiving both a first fabric login request on the first link that includes a second WWN associated with the FCF device and a second fabric login request on the second link that includes the second WWN associated with the FCF device, wherein the second trunk group causes the FC networking device to accept at least the portion of the first traffic from the first server device on the second link through which the first server device is not logged in to the FC networking device.

5. The FCF load balancing system of claim 4, wherein the FCF device is further configured to:
  generate a first map of a virtual trunk instance that includes a virtual trunk identifier mapped to the first link and the second link, wherein the first map includes the virtual trunk identifier that is associated with a first FC identifier assigned to a first node port of the FCF device providing the first link, the first WWN included with the first link, and a login type of the first link, and wherein the virtual trunk identifier is associated with a second FC identifier that is assigned to a second node port of the second link, the first WWN of the second link, and a login type of the second link, and wherein the FC networking device is configured to:
    generate a second map of the virtual trunk instance that includes the virtual trunk identifier mapped to the first link and the second link, wherein the second map includes the virtual trunk identifier that is associated with the first FC identifier that is assigned to the first node port of the FCF device providing the first link, the second WWN included with the first link, and the login type of the first link, and wherein the virtual trunk identifier is associated with the second FC identifier that is assigned to the second node port of the second link, the second WWN of the second link, and the login type of the second link.

6. The FCF load balancing system of claim 5, wherein the virtual trunk instance is removed in response to identifying that all links in the virtual trunk instance are no longer available.

7. The FCF load balancing system of claim 5, wherein the FCF device is further configured to:
  remove the first link from the first map of the virtual trunk instance in response to identifying that the first link is no longer available, and wherein the FC networking device is configured to:
    remove the first link from the second map of the virtual trunk instance in response to identifying that the first link is no longer available.

8. The FCF load balancing system of claim 7, wherein the FCF device is further configured to:
  provide, in response to identifying that the first link is no longer available, traffic from the first server device through the second link without logging out the first server device.

9. An Information Handling System (IHS), comprising:
  a plurality of ports;
  a processing system that is coupled to the plurality of ports; and
  a memory system that is coupled to the processing system and that includes instructions that, when executed by the processing system, cause the processing system to provide an N_Port ID Virtualization (NPIV) Proxy Gateway (NPG) engine that is configured to:
    group a first link between a Fibre Channel (FC) networking device and a first port of the plurality of ports with a second link between the FC networking device and a second port of the plurality of ports in response to receiving both a first fabric login accept on the first link that includes a first Worldwide Name (WWN) associated with the FC networking device and a second fabric login accept on the second link that includes the first WWN associated with the FC networking device as a first trunk group,
      wherein the receiving the first fabric login accept completes a first fabric login between the first port and the FC networking device via the first link, and wherein the receiving the second fabric login accept completes a second fabric login between the second port and the FC networking device via the second link;
    receive a third fabric login request from a first server device on a third port of the plurality of ports;
    select the first link on the first port over the second link on the second port through which to log the first server device into the FC networking device based on the third fabric login request;
    establish a third fabric login between the first server device and the FC networking device via the third port and the first link between the FC networking device and the first port; and
    provide at least a portion of first traffic, received from the first server device via the third port and that is only logged in to the FC networking device through the first link between the FC networking device and the first port, through the second link between the FC networking device and the second port when the first link and the second link are in the first trunk group.

10. The IHS of claim 9, wherein the NPG engine is further configured to:
  establish a fourth fabric login between the first server device and the FC networking device via the third port and the second link between the FC networking device and the second port when the first link is not available.

11. The IHS of claim 9, wherein the NPG engine is further configured to:
  group, subsequent to the grouping of the first link and the second link, a third link between the FC networking device and a fourth port of the plurality of ports with the first link and the second link in response to receiving a third fabric login accept on the third link that includes the first WWN associated with the FC networking device such that the third link is added to the first trunk group, wherein the receiving the third fabric login accept completes a fourth fabric login that is between the FCF device and the FC networking device via the third link.

12. The IHS of claim 11, wherein the NPG engine is further configured to:
generate a first map of a virtual trunk instance that includes a virtual trunk identifier mapped to the group of the first link and the second link, wherein the first map includes the virtual trunk identifier that is associated with a first FC identifier assigned to the first port, the first WWN included with the first link, and a login type of the first link, and wherein the virtual trunk identifier is associated with a second FC identifier that is assigned to second port, the first WWN of the second link, and a login type of the second link, and wherein the FC networking device is configured to:
generate a second map of the virtual trunk instance that includes the virtual trunk identifier mapped to the first link and the second link, wherein the second map includes the virtual trunk identifier that is associated with the first FC identifier that is assigned to first port, the second WWN included with the first link, and the login type of the first link, and wherein the virtual trunk identifier is associated with the second FC identifier that is assigned to the second port, the second WWN of the second link, and the login type of the second link.

13. The IHS of claim 12, wherein the NPG engine is further configured to:
remove the first link from the first map of the virtual trunk instance in response to identifying that the first link is no longer available, and wherein the FC networking device is configured to:
remove the first link from the second map of the virtual trunk instance in response to identifying that the first link is no longer available.

14. The IHS of claim 13, wherein the NPG engine is further configured to:
provide, in response to identifying that the first link is no longer available, traffic from the first server device through the second link without logging out the first server device.

15. A method of load balancing on a Fibre Channel Forwarder (FCF), comprising:
grouping, by an Fibre Channel Forwarder (FCF) device, a first link between a Fibre Channel (FC) networking device and a first port of a plurality of ports on the FCF device with a second link between the FC networking device and a second port of the plurality of ports in response to receiving both a first fabric login accept on the first link that includes a first Worldwide Name (WWN) associated with the FC networking device and a second fabric login accept on the second link that includes the first WWN associated with the FC networking device as a first trunk group,
wherein the receiving the first fabric login accept completes a first fabric login between the first port on the FCF device and the FC networking device via the first link, and wherein the receiving the second fabric login accept completes a second fabric login between the second port on the FCF device and the FC networking device via the second link;
receiving, by the FCF device, a third fabric login request from a first server device on a third port of the plurality of ports on the FCF device;
selecting, by the FCF device, the first link on the first port over the second link on the second port through which to log the first server device into the FC networking device based on the third fabric login request;
establishing, by the FCF device, a third fabric login between the first server device and the FC networking device via the third port and the first link between the FC networking device and the first port; and
providing, by the FCF device, at least a portion of first traffic, received from the first server device via the third port and that is only logged in to the FC networking device through the first link between the FCF device and first port, through the second link between the FC networking device and second port when the first link and the second link are in the first trunk group.

16. The method of claim 15, further comprising:
establishing, by the FCF device, a fourth fabric login between the first server device and the FC networking device via the third port and the second link between the FC networking device and the second port when the first link is not available.

17. The method of claim 15, further comprising:
grouping, by the FC networking device, the first link between the FC networking device and the first port of the FCF device with the second link between the FC networking device and the second port of the FCF device as a second trunk group in response to receiving both a first fabric login request on the first link that includes a second WWN associated with the FCF device and a second fabric login request on the second link that includes the second WWN associated with the FCF device;
group the first link between the FC networking device and the FCF device with the second link between the FC networking device and FCF device in response to receiving both a first fabric login request on the first link that includes a second WWN associated with the FCF device and a second fabric login request on the second link that includes the second WWN associated with the FCF device as a second trunk group, wherein the second trunk group causes the FC networking device to accept at least the portion of the first traffic from the first server device on the second link through which the first server device is not logged in to the FC networking device.

18. The method of claim 17, further comprising:
generating, by the FCF device, a first map of a virtual trunk instance that includes a virtual trunk identifier mapped to the first link and the second link, wherein the first map includes the virtual trunk identifier that is associated with a first FC identifier assigned to a first node port of the FCF device providing the first link, the first WWN included with the first link, and a login type of the first link, and wherein the virtual trunk identifier is associated with a second FC identifier that is assigned to a second node port of the second link, the first WWN of the second link, and a login type of the second link; and
generating, by the FC networking device, a second map of the virtual trunk instance that includes the virtual trunk identifier mapped to the first link and the second link, wherein the second map includes the virtual trunk identifier that is associated with the first FC identifier that is assigned to the first node port of the FCF device providing the first link, the second WWN included with the first link, and the login type of the first link, and wherein the virtual trunk identifier is associated with the second FC identifier that is assigned to the second node port of the second link, the second WWN of the second link, and the login type of the second link.

19. The method of claim 18, further comprising:

removing, by the FCF device, the first link from the first map of the virtual trunk instance in response to identifying that the first link is no longer available; and removing, by the FC networking device, the first link from the second map of the virtual trunk instance in response to identifying that the first link is no longer available.

20. The method of claim 19, further comprising:

providing, by the FCF device and in response to identifying that the first link is no longer available, traffic from the first server device through the second link without logging out the first server device.

* * * * *